United States Patent [19]

Igelhaut

[11] 3,978,736
[45] Sept. 7, 1976

[54] PILGRIM STEP INDEXING MECHANISM

[75] Inventor: Hans Igelhaut, Leerstetten, Germany

[73] Assignee: Triumph Werke Nurnberg A.G., Nurnberg, Germany

[22] Filed: May 22, 1975

[21] Appl. No.: 579,894

[30] Foreign Application Priority Data
Jan. 16, 1975   Germany............................ 2501578

[52] U.S. Cl. .................................. 74/112; 74/125; 74/575; 74/577 M; 226/49; 226/157
[51] Int. Cl.² ........................................ F16H 27/02
[58] Field of Search ............ 74/577 M, 577 R, 125, 74/112; 226/49, 157; 75/575

[56] References Cited
UNITED STATES PATENTS
| | | | |
|---|---|---|---|
| 3,090,555 | 5/1963 | Hell ................................. | 74/125 X |
| 3,354,733 | 11/1967 | Cartier ............................... | 74/125 |
| 3,450,409 | 6/1969 | Pitzer ................................ | 74/125 |
| 3,871,238 | 3/1975 | Kitai ................................. | 74/112 |

Primary Examiner—Samuel Scott
Assistant Examiner—F. D. Shoemaker
Attorney, Agent, or Firm—Joseph R. Spalla; Arthur Gershman

[57] ABSTRACT

A pilgrim step indexing mechanism provided with oppositely facing toothed ratchet wheels of the same pitch is associated with a single indexing pawl and an associated detent spring which not only detentably holds the ratchet wheels but also biases the indexing pawl to engage the ratchet wheels. The indexing pawl has two teeth one of which engages one of the ratchet wheels during a reverse stroke of the pawl to reverse feed both ratchets one increment and during a forward stroke of the pawl to advance both ratchets two increments. The ratchet wheels may be connected with a platen of a printer whereby a line of printwork, after printing, will be positioned two line spaces above the printing line for easy viewing.

6 Claims, 4 Drawing Figures

PILGRIM STEP INDEXING MECHANISM

This invention relates to indexing mechanism for moving a record in calculating or like machines; more particularly, it relates to indexing mechanism for advancing the platen two line spaces after each printing and to reverse the platen one line space before printing of a successive line; and specifically, it relates to a pilgrim step indexing mechanism having opposed ratchet wheels and a single indexing double toothed pawl cyclically driven to index the ratchets.

Such pilgrim step switching mechanisms are required in various control processes. For example, in the printing unit of calculating machines it is known to advance the paper tape upwardly by two steps in order to make a printed line visible. Incident to the next print cycle, the paper tape is reversely indexed back by one line prior to the next printing operation so as to obtain close line spacing. This control is usually effected by means of two ratchet wheels mounted on the shaft to be controlled. Each ratchet wheel interacts with an associated pawl controlled by means of a transmission. The one pawl causes indexing by one step in one direction, and the other pawl causes indexing by two steps in the opposite direction. This requires a relatively costly control transmission for the pawls.

In accordance with the invention, a single pawl driven by means of an eccentric driver and having two indexing teeth disposed in different planes is provided to rotate, through different angles of rotation, two ratchet wheels having teeth directed in opposite directions. In such an indexing mechanism so designed, the single pawl is driven by a shaft, usually present in the machine, which is rotated 360° in each printing cycle.

It is an object of the invention to provide a simplified pilgrim step ratchet indexing mechanism.

Another object of the invention is in the provision of a single pawl pilgrim step indexing mechanism.

Still another object of the invention is in the provision of a single pawl pilgrim step indexing mechanism having two teeth operable during a cycle to act on and rotate associated ratchets through different angular increments in reverse order.

A further object of the invention is to provide a pilgrim step indexing mechanism having a minimum number of components interacting in a simple fashion.

Still other objects, features and advantages of the present invention will become apparent to those skilled in the art from a reading of the following detailed description of a preferred embodiment, taken in conjunction with the accompanying drawing, wherein.

Figure 3:
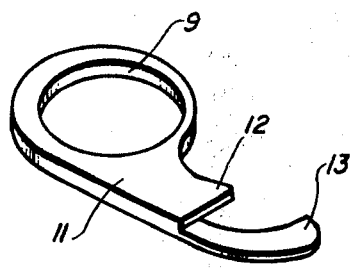
FIG. 3 shows a perspective view of the pawl of the invention.
Figure 1:
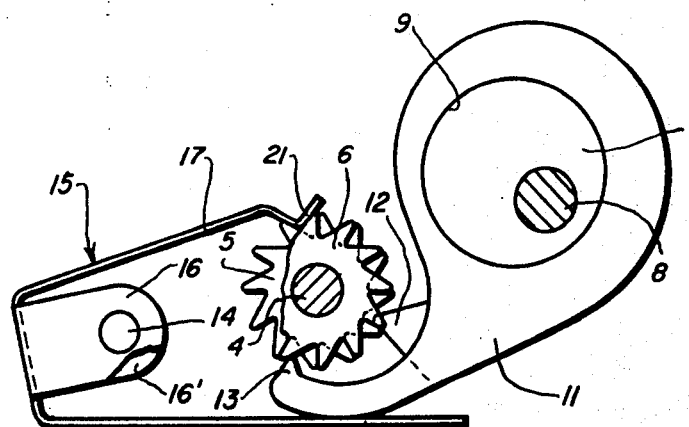
FIG. 1 is a side elevational view of the indexing mechanism.
Figure 2:
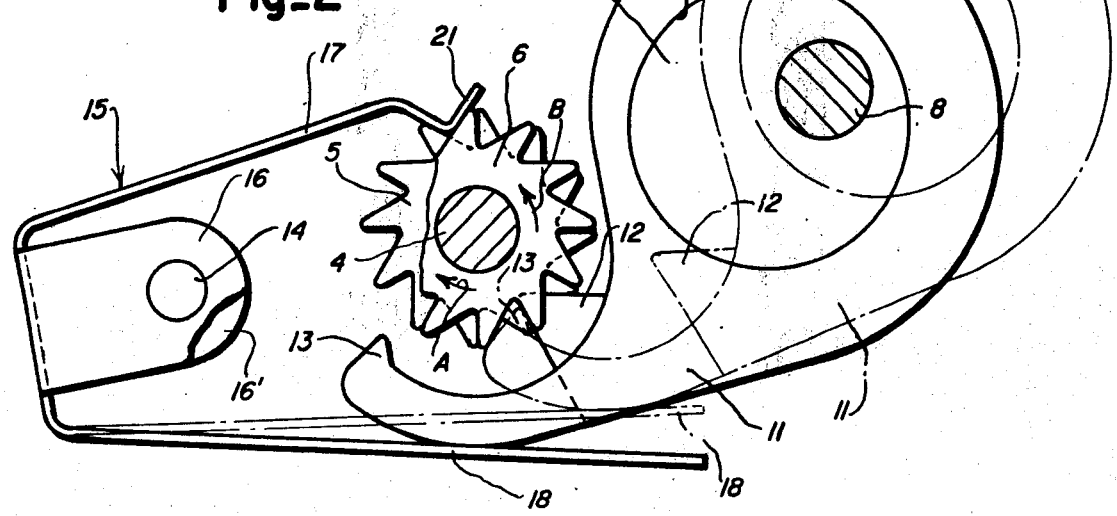
FIG. 2 is a side elevational view similar to FIG. 1 showing active positions of the pawl.

Referring now to the drawing and with particular reference to FIG. 1, there is shown a rotatably supported shaft 4 which is associated with a printing platen, not shown. Secured to one end of the shaft 4 are a pair of identical ratchet wheels 5 and 6 which are joined together with the teeth thereof facing in opposite directions. A circular driver 7 eccentrically disposed on a cyclically driven shaft 8 is received within a circular opening 9 of an indexing pawl 11. The pawl 11 has, as shown more clearly in FIG. 3, two indexing teeth 12 and 13 disposed in offset planes with tooth 12 disposed forwardly of tooth 13. Teeth 12 and 13 interact respectively with reverse ratchet wheel 5 and advance ratchet wheel 6. As shown in FIGS. 1 and 2, a frame supported pivot pin 14 pivotally supports a single piece detent spring generally designated by 15 as by means of two integral tabs 16, 16'. The detent spring 15 has an upper leg 17 and a lower leg 18. The bent end 21 of the upper leg 17 serves as a detent for both of the ratchet wheels 5 and 6 while the lower leg 18 acts on the pawl 11 intermediate the teeth 12 and 13 to urge the pawl 11 upwardly toward engagement with the ratchet wheels 5 and 6.

As hereinbefore noted, the indexing mechanism of the invention may be associated with the platen of a printer, such as a printing calculator, about which a record (FIG. 4) is mounted to receive printing.

In operation, when a printing cycle is initiated, shaft 8 will be turned 360° in the course of the printing cycle. As the shaft 8 turns, the eccentric driver 7 will first move the pawl 11 from the position shown in FIG. 1 to the left, to the full line position shown in FIG. 2, causing the tooth 12 to act on reverse ratchet wheel 5 and rotating both ratchet wheels 5 and 6 by one tooth in the direction of arrow A. As the shaft 8 continues to turn, and after printing on the record 22 has occurred, the tooth 13 of the indexing pawl 11 will engage the advance ratchet wheel 6 and rotate both ratchet wheels 5 and 6 by two teeth in the direction of arrow B to the dash line position shown in FIG. 3, with the lower leg 18 of the detent spring 15 maintaining the tooth 13 of the indexing pawl 11 in engagement with the ratchet wheel 5.

Figure 4:
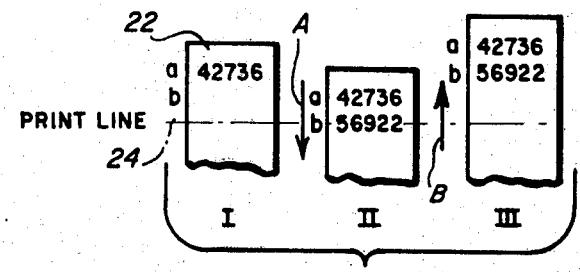
FIG. 4 shows the movement of a record supported by a platen associated with the indexing mechanism of the invention over a printing cycle.

With reference to FIG. 4, the record 22 is shown positioned relative to a print line 24. Position I of the record shows the position of the record relative to the print line 24 following a complete printing cycle where, it will be noted, the printed line a is two line spaces above the print line 24. Movement of the mechanism in the direction of arrow A during a cycle shifts the record 22 to position a blank line b below the printed line a at the print line 24 as shown in Position II to receive the next successive line of print, after which the record is moved in the direction of arrow B two spaces to the Position III, whereby the last printed line b is positioned two line spaces above the printed line for easy viewing.

The invention claimed is:

1. Indexing mechanism comprising
    a shaft to be indexed,
    a pair of ratchet wheels fixed to said shaft, said ratchet wheels having oppositely facing teeth,
    a single pawl having a pair of spaced teeth operative to engage one and then the other of said ratchet wheels,
    and cyclic means for driving said pawl to rotatively index said ratchets in a first direction through a predetermined angular increment and in a second direction through a larger angular increment.

2. Index mechanism as recited in claim 1, said ratchet wheels being identical.

3. Index mechanism as recited in claim 1, said pawl teeth being spaced such that indexing movement in a second direction is twice that in the first direction.

4. Index mechanism as recited in claim 3, said pawl teeth being positioned relative to said ratchet wheels so that cyclic movement in said first direction occurs during a reverse stroke of said pawl, and movement in the other direction occurs during the forward stroke of said pawl.

5. Indexing mechanism as recited in claim 1, further comprising detent means positioned to releasably hold said ratchet wheels positioned and to bias said pawl to engage said ratchet wheels.

6. Index mechanism as recited in claim 5, said detent means having a U-shape pivoted at the base leg of the U, and positioned with its parallel legs respectively contacting said ratchet wheels and said pawl.

* * * * *